United States Patent [19]
Takeda

[11] Patent Number: 5,689,327
[45] Date of Patent: Nov. 18, 1997

[54] LASER PROCESSING DEVICE

[75] Inventor: Minoru Takeda, Kanagawa, Japan

[73] Assignee: Sony Corporation, Tokyo, Japan

[21] Appl. No.: 520,703

[22] Filed: Aug. 29, 1995

[30] Foreign Application Priority Data

Aug. 30, 1994 [JP] Japan .................................. 6-205276

[51] Int. Cl.⁶ .............................. B23K 26/00; G01C 3/08
[52] U.S. Cl. .................. 356/4.01; 219/121.6; 219/121.85
[58] Field of Search ........................... 219/121.6, 121.63,
219/121.65, 121.67, 121.68, 121.85, 121.86;
356/4.01

[56] References Cited

U.S. PATENT DOCUMENTS

| | | |
|---|---|---|
| 4,464,413 | 8/1984 | Murphy et al. ......................... 427/6 |
| 4,720,621 | 1/1988 | Langen ................................ 219/121 L |
| 4,769,523 | 9/1988 | Tanimoto et al. ..................... 219/121.6 |
| 5,239,552 | 8/1993 | Okuyama et al. .......................... 372/58 |
| 5,449,882 | 9/1995 | Black et al. ......................... 219/121.83 |
| 5,576,125 | 11/1996 | Bih ...................................... 430/5 |

*Primary Examiner*—Mark Hellner
*Attorney, Agent, or Firm*—Hill, Steadman & Simpson

[57] ABSTRACT

A laser processing device for collecting a laser beam from laser beam radiating means using an objective lens and irradiating a surface of a sample with the collected laser beam to form a fine pattern thereon is disclosed. The device comprises a uniform pellicle film having high transmittance to wavelength of the laser beam and provided between the objective lens and the surface of the sample. The laser beam radiated from the laser beam radiating means passes through a shutter and a beam expander, and is reflected by a dichroic mirror. The laser beam is then collected by the objective lens and passes through the pellicle film to be radiated on the surface of the sample. Thus, laser processing may be carried out without deteriorating performance of the objective lens.

3 Claims, 2 Drawing Sheets

LASER PROCESSING DEVICE

BACKGROUND OF THE INVENTION

1. Field of the Invention

This invention relates to a laser processing device for collecting a laser beam from laser beam radiating means using an objective lens and irradiating the collected laser beam with the surface of a sample to form a fine pattern.

2. Description of the Related Art

Conventionally, there has been a laser processing device for irradiating the surface of a sample directly with a laser beam of a high radiation density to form a μm-scale fine pattern on the sample. This laser processing device utilizes so-called ablation of the sample by the laser beam. Therefore, transpired substances are generated from the surface of the sample when the surface of the sample is irradiated with the laser beam.

Such laser processing device uses an objective lens for collecting the laser beam on the surface of the sample. Since the operating distance of the objective lens in general is only about several mm, the transpired substances tend to adhere to the glass surface of the lowermost lens constituting the objective lens. Therefore, when the sample is irradiated with the laser beam for a long time, the adhered substances are deposited on the glass surface, thus considerably deteriorating the laser beam transmittance. In order to prevent deposition of the substances, a technique of setting a cover glass between the objective lens and the sample is described in detail in the JP Patent Laid-Open Publication No. SHO59-178193 (publicized on Oct. 9, 1984), and a technique of exhausting the air from the vicinity of the objective lens is described in detail in the JP Patent Laid-Open Publication No. HEI01-31590 (publicized on Feb. 1, 1989).

However, when the technique of setting the cover glass is employed, the cover glass having a thickness of several mm causes spherical aberration which deteriorates image quality and beam collecting capability of the objective lens.

Even when the technique of exhausting the air from the vicinity of the objective lens is employed, it is difficult to prevent deposition of the transpired substances.

OBJECT AND SUMMARY OF THE INVENTION

In view of the foregoing, it is an object of the present invention to provide a laser processing device whereby laser processing may be carried out without deteriorating the performance of the objective lens.

According to the present invention, there is provided a laser processing device for collecting a laser beam from laser beam radiating means using an objective lens and irradiating a surface of a sample with the collected laser beam to form a fine pattern, the device comprising a uniform pellicle film having high transmittance to wavelength of the laser beam and provided between the objective lens and the surface of the sample.

The pellicle film is one to tens of μm in thickness.

The pellicle film has its setting position fixed by a pellicle film supporting holder, and is attached/detached along with the supporting holder.

In the laser processing by the laser processing device according to the present invention, the uniform pellicle film having high transmittance to the wavelength of the laser beam is set between the surface of the sample and the objective lens for collecting the laser beam on the sample. Thus, transpired substances from the surface of the sample are prevented from being adhered and deposited on the objective lens without affecting image quality and beam collecting capability of the objective lens.

Since the pellicle film is one to tens of μm in thickness, it does not shield the laser beam from the objective lens.

The pellicle film has its setting position fixed by the supporting holder for holding the pellicle film, and is attached/detached along with this supporting holder. Therefore, the pellicle film can be replaced in a simple construction. By replacing the pellicle film constantly, it becomes possible to use the laser processing device for a long time without lowering radiation intensity of the laser beam.

DESCRIPTION OF THE PREFERRED EMBODIMENTS

Figure 1:
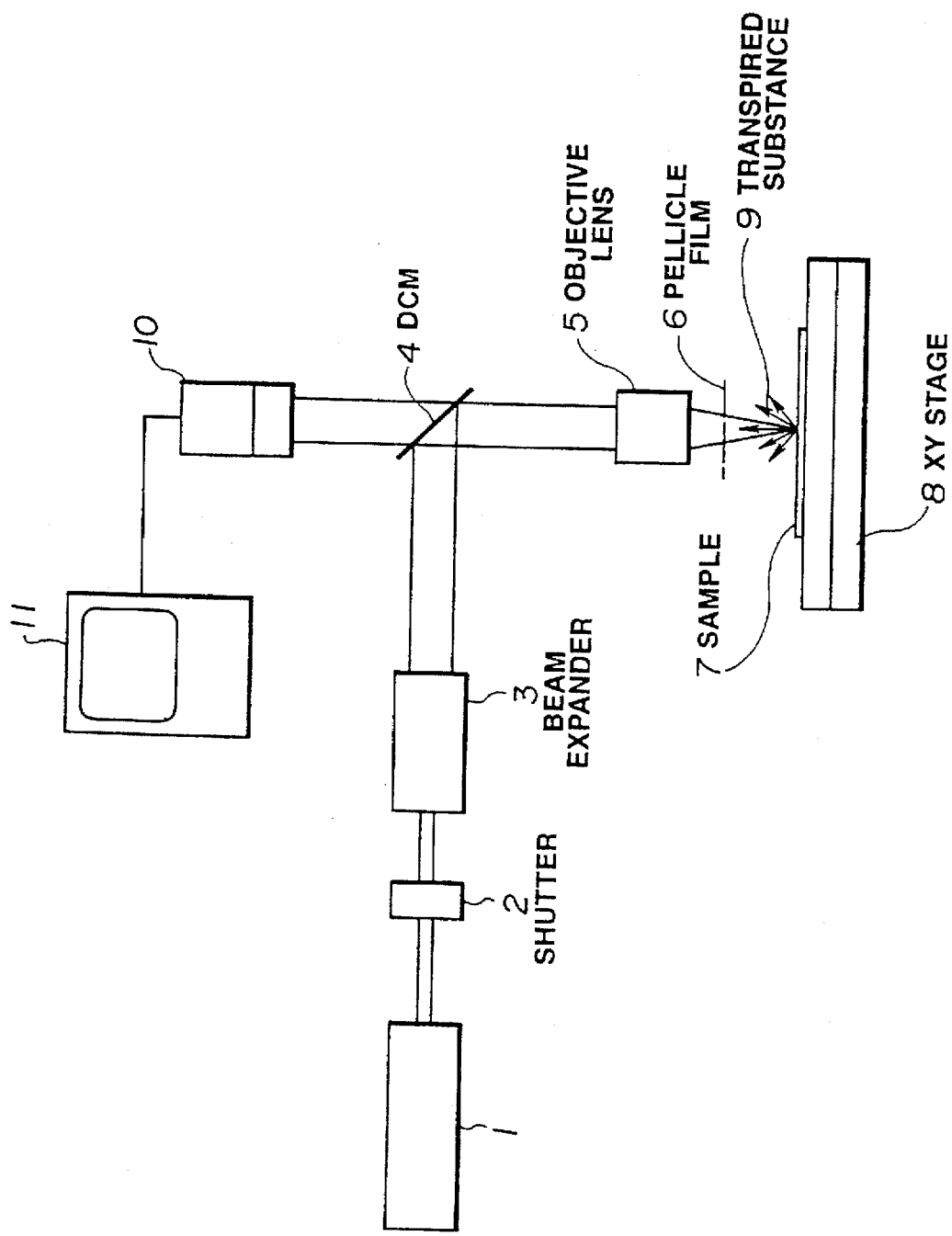
FIG. 1 is a view showing the schematic structure of a laser processing device according to the present invention.

Preferred embodiments of the present invention will now be described in detail with reference to the attached drawings. FIG. 1 shows the schematic structure of a laser processing device according to the present invention.

With the laser processing device of this embodiment, a laser beam for processing is collected to a spot size of the order of μm on the surface of a sample and the sample is two-dimensionally scanned by an XY stage to form a fine pattern on the surface of the sample.

Specifically, the laser beam for processing radiated from a laser beam radiating unit i has its quantity of light adjusted by a shutter 2, and then has its beam diameter expanded by a beam expander 3. The laser beam with the beam diameter expanded is reflected by a dichroic mirror (DCM) 4 to enter an entrance pupil of an objective lens 5. The laser beam is then collected to the focal length of the objective lens 5 via a pellicle film 8 as later described. The focal length of the objective lens 5 is adjusted to collect the laser beam on the surface of a sample 7.

The reflected light from the surface of the sample 7 enters the dichroic mirror 4 via the pellicle film 8 and the objective lens 5. The reflected light passes through the dichroic mirror 4 and is then subject to image formation on a solid image pick-up device or so-called CCD 10. Thus, an image obtained by the CCD can be observed by a monitor 11 during the formation of the fine pattern on the sample 7.

As described above, in the laser processing device of the present embodiment, the pellicle film 8 as a thin film of uniform thickness having high transmittance to the wavelength of the laser beam is set between the objective lens 5 and the sample 7. The pellicle film 6 is composed of an organic polymer with a thickness of one to tens of μm, made up for example of cellulose based polymer. The pellicle film 6 has sufficient transmittance to the wavelength of the laser beam, that is, transmittance of 90% or higher in a range such that the pellicle film 6 is not damaged by absorption of the laser.

Figure 2:
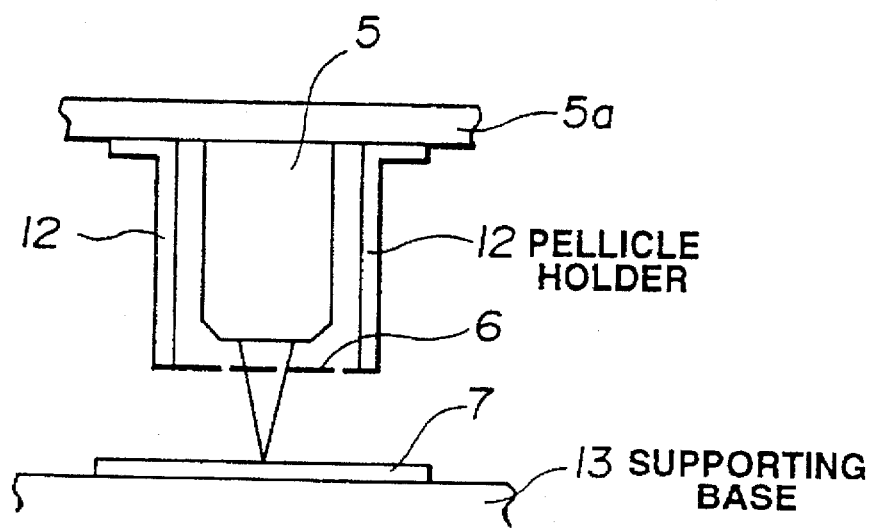
FIG. 2 is a view showing the schematic structure of a first example in which a pellicle film is set.

FIG. 2 shows the schematic structure of a first example in which the pellicle film 6 is set within the laser processing device according to the present invention.

In this first example, a pellicle holder 12 for holding the pellicle film 6 is mounted on the lower surface of a supporting plate 5a for supporting the objective lens 5, in a manner to surround the objective lens 5. The pellicle film 6 is attached on the lower side of the pellicle holder 12, that is, between the objective lens 5 and the sample 7 set on a supporting base 13. Thus, the setting position of the pellicle film 6 is fixed.

Figure 3:
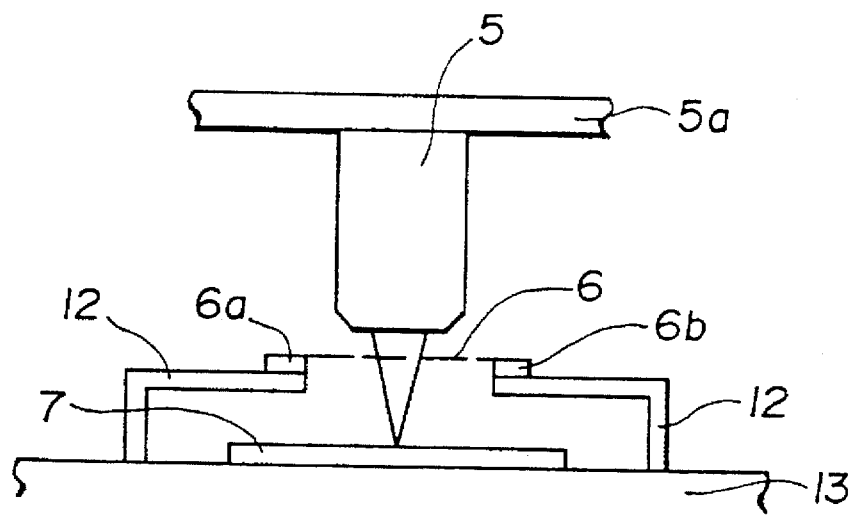
FIG. 3 is a view showing the schematic structure of a second example in which the pellicle film is set.

FIG. 3 shows the schematic structure of a second example in which the pellicle film 8 is set within the laser processing device according to the present invention.

In this second example, the pellicle holder 12 is mounted on the upper part of the supporting base on which the sample is set, in a manner to surround the sample 7. The pellicle film 8 is attached to projections 6a, 6b provided on the upper end of the pellicle holder 12 and between the objective lens 5 and the sample 7. Thus, the setting position of the pellicle film 6 is fixed.

In the above-described two examples, the pellicle film 6 can be attached and detached along with the pellicle holder 12. Thus, when transpired substances 9 from the sample 7 are deposited on the pellicle film 6 by long-time laser processing and lower the transmittance of the laser beam, the pellicle film 6 is replaced along with the pellicle holder 12 by a new one.

Thus, with the sample construction, it is possible to protect the objective lens 5 from the transpired substances 9 generated in the laser processing and to repeatedly operate the laser processing device for a long time without adversely affecting the beam collecting capability of the objective lens 5.

What is claimed is:

1. A laser processing device for collecting a laser beam from laser beam radiating means using an objective lens and irradiating a surface of a sample with the collected laser beam to form a fine pattern thereon, the device further comprising a uniform pellicle film having high transmittance to the wavelength of the laser beam, said pellicle film being provided between the objective lens and the surface of the sample.

2. The laser processing device as claimed in claim 1, wherein the pellicle film is one to tens of μm in thickness.

3. The laser processing device as claimed in claim 1, wherein the pellicle film has its setting position fixed by a pellicle film supporting holder, and is attached/detached along with the supporting holder.

* * * * *